(12) United States Patent
Moriyama et al.

(10) Patent No.: US 9,126,505 B2
(45) Date of Patent: Sep. 8, 2015

(54) SEAT SLIDE APPARATUS (75) Inventors: Genta Moriyama, Anjo (JP); Tsutomu Oya, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 276 days.

(21) Appl. No.: 13/551,955

(22) Filed: Jul. 18, 2012

(65) Prior Publication Data
US 2013/0020459 A1   Jan. 24, 2013

(30) Foreign Application Priority Data

Jul. 19, 2011   (JP) ................................ 2011-158485

(51) Int. Cl.
*B60N 2/08* (2006.01)
*B60N 2/07* (2006.01)
*B60N 2/01* (2006.01)

(52) U.S. Cl.
CPC ............... *B60N 2/0705* (2013.01); *B60N 2/01* (2013.01); *B60N 2/0722* (2013.01); *B60N 2205/20* (2013.01)

(58) Field of Classification Search
CPC ...... B60N 2/07; B60N 2/0722; B60N 2/0715; B60N 2/0705; B60N 2/0825; B60N 2/0843; B60N 2/0887; B60N 2/06; B60N 2/0735; B60N 2/0208
USPC ................................... 248/424, 425, 430, 429
See application file for complete search history.

(56) References Cited

U.S. PATENT DOCUMENTS

| | | | | |
|---|---|---|---|---|
| 3,394,912 A | * | 7/1968 | Bullen | 248/430 |
| 4,432,524 A | * | 2/1984 | Wize | 248/395 |
| 4,941,636 A | * | 7/1990 | Fujiwara et al. | 248/430 |
| 5,350,148 A | * | 9/1994 | Yamamura | 248/430 |
| 5,524,504 A | * | 6/1996 | Brandoli et al. | 74/527 |
| 5,785,291 A | * | 7/1998 | Chang | 248/429 |
| 5,961,088 A | * | 10/1999 | Chabanne et al. | 248/429 |
| 6,220,642 B1 | * | 4/2001 | Ito et al. | 296/65.14 |
| 6,691,971 B2 | * | 2/2004 | Yamada et al. | 248/430 |
| 6,953,178 B2 | * | 10/2005 | Yamada et al. | 248/429 |
| 7,314,242 B2 | * | 1/2008 | Masunaga et al. | 296/65.13 |
| 8,091,851 B2 | * | 1/2012 | Yamada et al. | 248/430 |
| 8,146,944 B2 | * | 4/2012 | Miller | 280/769 |
| 8,251,336 B2 | * | 8/2012 | Kimura et al. | 248/430 |
| 8,297,583 B2 | * | 10/2012 | Kimura et al. | 248/430 |
| 8,556,222 B2 | * | 10/2013 | Yamada et al. | 248/430 |
| 2003/0094558 A1 | * | 5/2003 | Yamada et al. | 248/429 |
| 2009/0102261 A1 | * | 4/2009 | Bernhardt et al. | 297/344.1 |

(Continued)

FOREIGN PATENT DOCUMENTS

| | | |
|---|---|---|
| JP | H09-254682 A | 9/1997 |
| JP | 3678191 | 5/2005 |

*Primary Examiner* — Nkeisha Smith (74) *Attorney, Agent, or Firm* — Oblon, McClelland, Maier & Neustadt, L.L.P.

(57) ABSTRACT

A seat slide apparatus includes a support rail adapted to be attached to one of a seat and a seat attachment surface, a movable rail configured to be slidable relative to the support rail, a roller arranged between the support rail and the movable rail and guiding the movable rail to move relative to the support rail, and a vibration restricting member arranged between the support rail and the movable rail to restrict a vibration between the support rail and the movable rail, the vibration restricting member including a sliding contact point receiving a sliding load in a vertical direction of the movable rail, the sliding contact point being arranged to overlap the roller in a sliding direction of the movable rail.

6 Claims, 8 Drawing Sheets

(56) References Cited

U.S. PATENT DOCUMENTS

| | | | |
|---|---|---|---|
| 2010/0320353 A1* | 12/2010 | Kojima et al. | 248/430 |
| 2011/0233371 A1* | 9/2011 | Kitamura et al. | 248/430 |
| 2012/0061547 A1* | 3/2012 | Moriyama et al. | 248/430 |
| 2012/0074288 A1* | 3/2012 | Yamada et al. | 248/430 |
| 2012/0199719 A1* | 8/2012 | Yamada et al. | 248/430 |
| 2014/0110554 A1* | 4/2014 | Oya et al. | 248/430 |

* cited by examiner

FIG. 15 Prior Art

SEAT SLIDE APPARATUS

CROSS REFERENCE TO RELATED APPLICATIONS

This application is based on and claims priority under 35 U.S.C. §119 to Japanese Patent Application 2011-158485, filed on Jul. 19, 2011, the entire content of which is incorporated herein by reference.

TECHNICAL FIELD

This disclosure generally relates to a seat slide apparatus for sliding a seat.

BACKGROUND DISCUSSION

In general, a seat of a vehicle is arranged at a vehicle body by a seat slide apparatus for adjusting a position of the seat in a longitudinal direction of the vehicle body. The seat slide apparatus allows the seat to slide along a rail. In particular, the seat slide apparatus is configured so that rollers arranged at the rail therealong roll to adjust the position of the seat in the longitudinal direction of the vehicle body. A known seat slide apparatus (a seat slide apparatus 81 in FIG. 13) is disclosed in JP3678191B (which will be hereinafter referred to as Reference 1).

Figure 13:
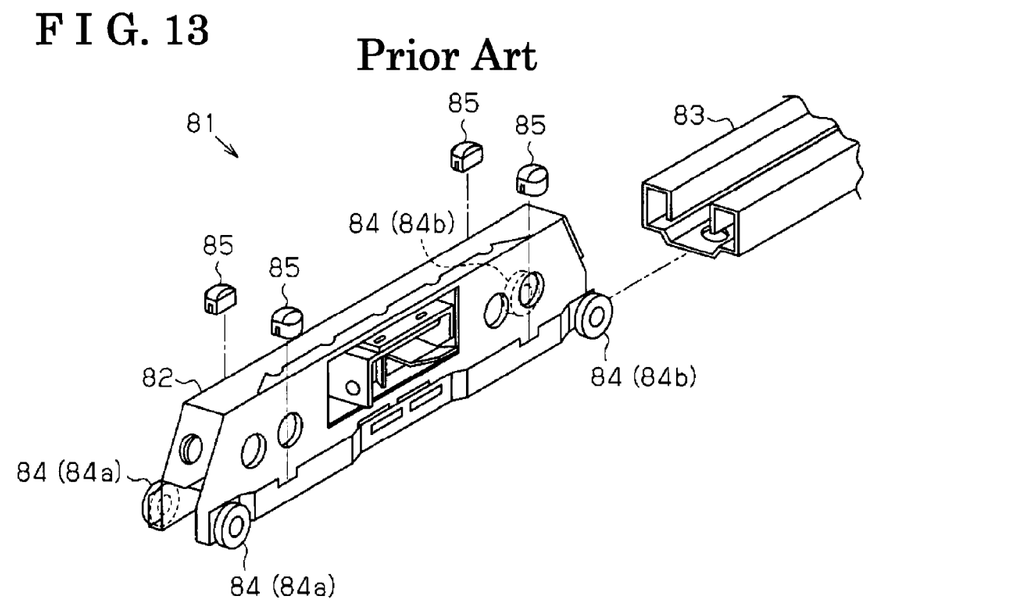
FIG. 13 is a perspective view illustrating a configuration of a known seat slide apparatus.

The seat slide apparatus 81 disclosed in Reference 1 is illustrated in FIG. 13. The seat slide apparatus 81 includes a pair of upper rails 82 adapted to be attached to a lower surface of a seat and a pair of lower rails 83 adapted to be arranged on a floor of a vehicle (the upper rail 82 and the lower rail 83 arranged at one of both sides in a width direction of the seat are shown in FIG. 13). The upper rail 82 is slidable relative to the lower rail 83 in a longitudinal direction thereof. Pairs of rollers 84 are arranged at front and rear ends of the upper rail 82, that is, the four rollers 84 are arranged at the upper rail 82. The rollers 84 guide the upper rail 82 to slide along the lower rail 83. A pair of shoes 85 is arranged in vicinity of the pair of rollers 84 (84a) positioned at the front end of the upper rail 82 and another pair of shoes 85 is arranged in vicinity of the pair of rollers 84 (84b) positioned at the rear end of the upper rail 82, that is, the four shoes 85 are arranged at the upper rail 82. Each of the shoes 85 functions to restrict vibrations between the upper rail 82 and the lower rail 83.

When adjusting a position of the seat in a longitudinal direction of a vehicle body, the rollers 84 guide the upper rail 82 to slide along the lower rail 83; thereby, the position of the seat may be adjusted by a small force. In addition, the vibrations between the upper rail 82 and the lower rail 83 are restricted or absorbed by the shoes 85; therefore, the upper rail 82 is smoothly slidable relative to the lower rail 83.

Figure 14:
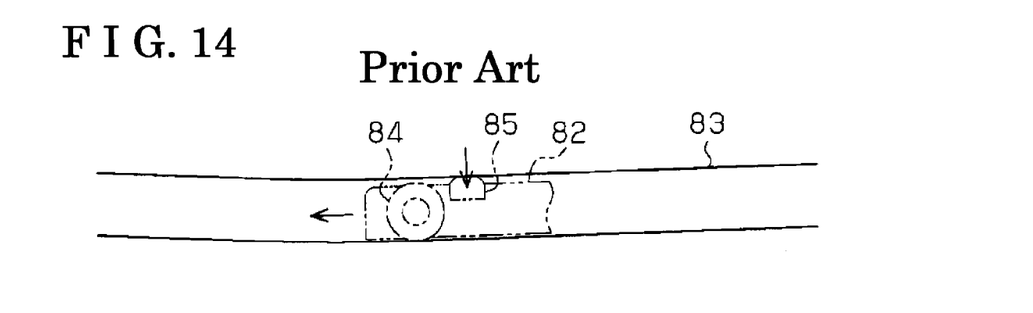
FIG. 14 is an explanation drawing illustrating a state where an upper rail slides relative a lower rail that is curved downwardly, according to the known seat slide apparatus.

In the seat slide apparatus 81 disclosed in Reference 1, each of the rollers 84 is arranged at an exterior side of the shoe 85 in a width direction of the upper rail 82 as illustrated in FIG. 13. Therefore, for example, in a case where the lower rail 83 is configured to form a round shape protruding downwardly as shown in FIG. 14, an amount of elastic deformation of the shoe 85 and a sliding load may increase when the upper rail 82 moves through a curved area of the lower rail 83. As a result, the upper rail 82 may not smoothly slide along the lower rail 83.

Figure 15:
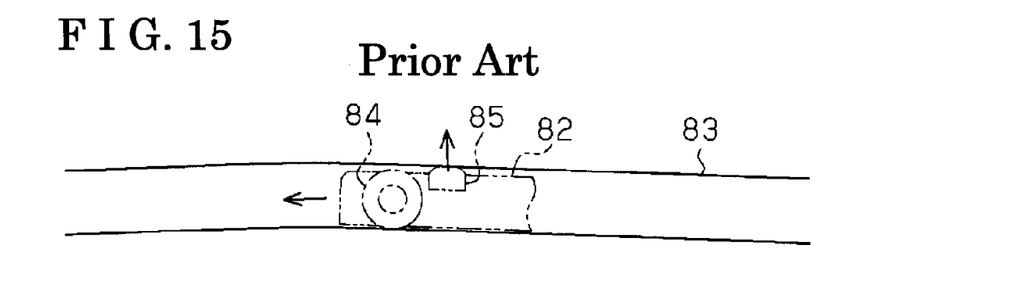
FIG. 15 is an explanation drawing illustrating a state where the upper rail slides relative to the lower rail that is curved upwardly, according to the known seat slide apparatus.

On the other hand, for example, in a case where the lower rail 83 is configured to form a round shape protruding upwardly as shown in FIG. 15, a sliding load may decrease when the upper rail 82 moves through a curved area of the lower rail 83. At this time, vibrations between the upper rail 82 and the lower rail 83 in a vertical direction thereof may increase; therefore, the stable sliding movement of the upper rail 82 may not be attained. In addition, a position of a seat lock mechanism of the seat slide apparatus 81 may be misaligned in the curved area; therefore, the position of the seat may not be fixed in the longitudinal direction of the vehicle body.

A need thus exists for a seat slide apparatus which is not susceptible to the drawbacks mentioned above.

SUMMARY

According to an aspect of this disclosure, a seat slide apparatus includes a support rail adapted to be attached to one of a seat and a seat attachment surface, a movable rail configured to be slidable relative to the support rail, a roller arranged between the support rail and the movable rail and guiding the movable rail to move relative to the support rail, and a vibration restricting member arranged between the support rail and the movable rail to restrict a vibration between the support rail and the movable rail, the vibration restricting member including a sliding contact point receiving a sliding load in a vertical direction of the movable rail, the sliding contact point being arranged to overlap the roller in a sliding direction of the movable rail.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
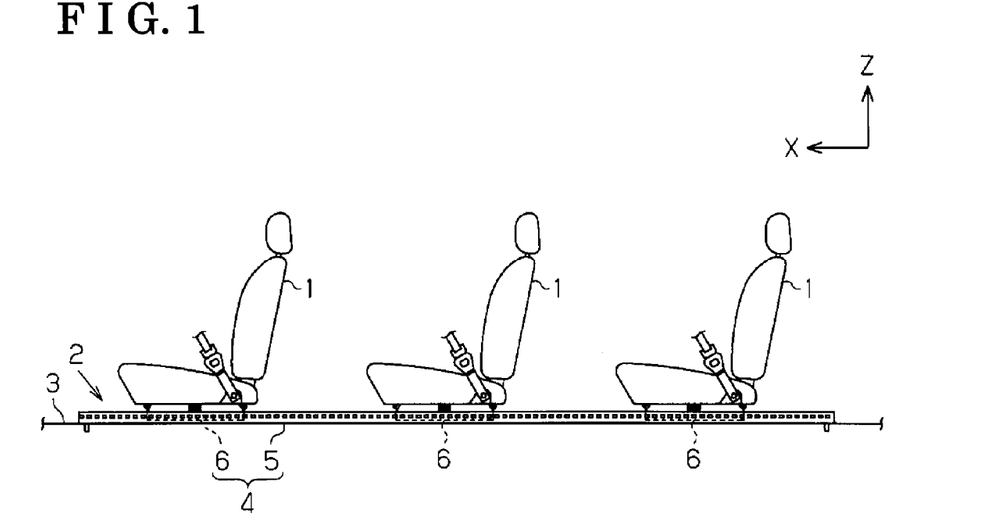
FIG. 1 is a side view illustrating an outline of a seat slide apparatus according to an embodiment disclosed here.
Figure 2:
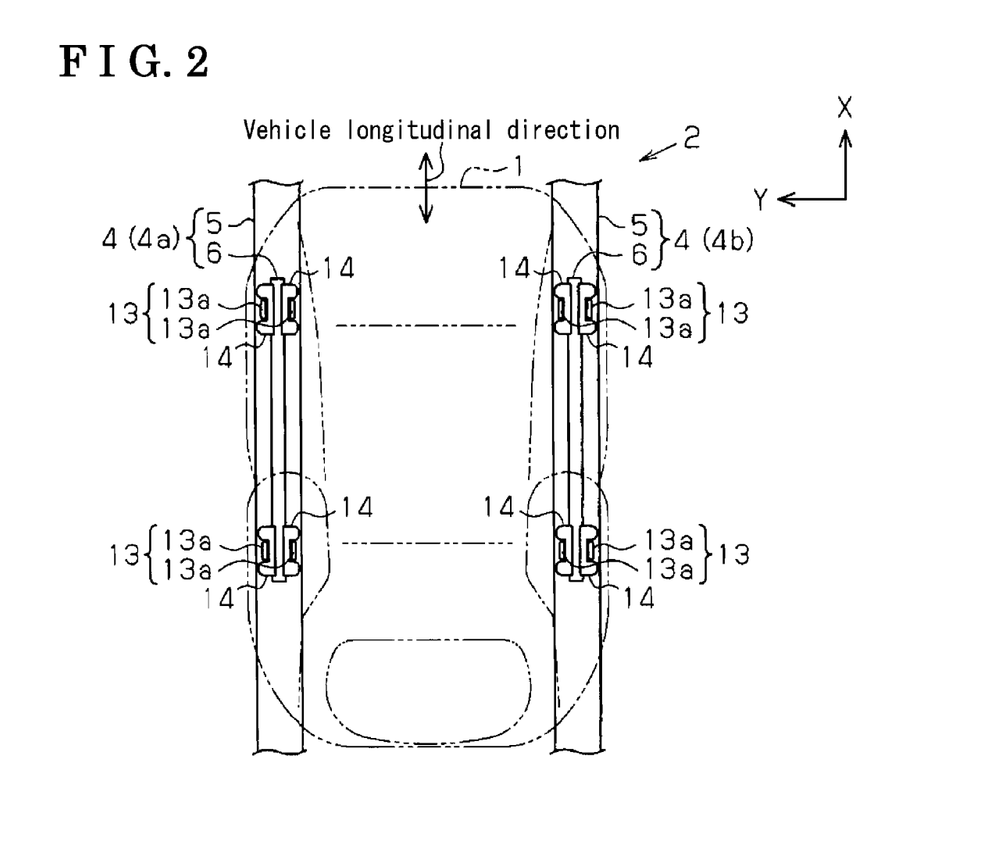
FIG. 2 is a top plan view of the seat slide apparatus according to the embodiment disclosed here.

A seat slide apparatus 2 according to an embodiment of this disclosure will be described as follows with reference to FIGS. 1 to 10. As illustrated in FIGS. 1 and 2, a seat 1 arranged in a vehicle, for example, a van or a minivan is mounted to a floor 3 of the vehicle by the seat slide apparatus 2. The seat slide apparatus 2 slides the seat 1 in a longitudinal direction of a vehicle body (the longitudinal direction is a direction along an X-axis in FIG. 1). The seat slide apparatus 2 is configured to adjust the seat 1 to multiple positions in the longitudinal direction. According to the embodiment, the seat 1 may be applied as any of a front seat, a second-row seat, and a third-row seat. In addition, according to the embodiment, the floor 3 corresponds to a seat attachment surface.

The seat slide apparatus 2 includes a pair of rail units 4 arranged in a width direction of the seat 1 (the width direction is a direction along a Y-axis in FIG. 2). Each of the rail units 4 has an elongated shape. The seat 1 is supported via the pair of rail units 4 by the floor 3. According to the embodiment, the pair of rail units 4 includes a left rail unit 4a (on the left side in FIG. 2) and a right rail unit 4b (on the right side in FIG. 2). The left rail unit 4a and the right rail unit 4b are symmetrically arranged in the width direction (the left and right rail units 4a and 4b will be hereinafter simply referred to as the rail units 4a and 4b).

Figure 3:
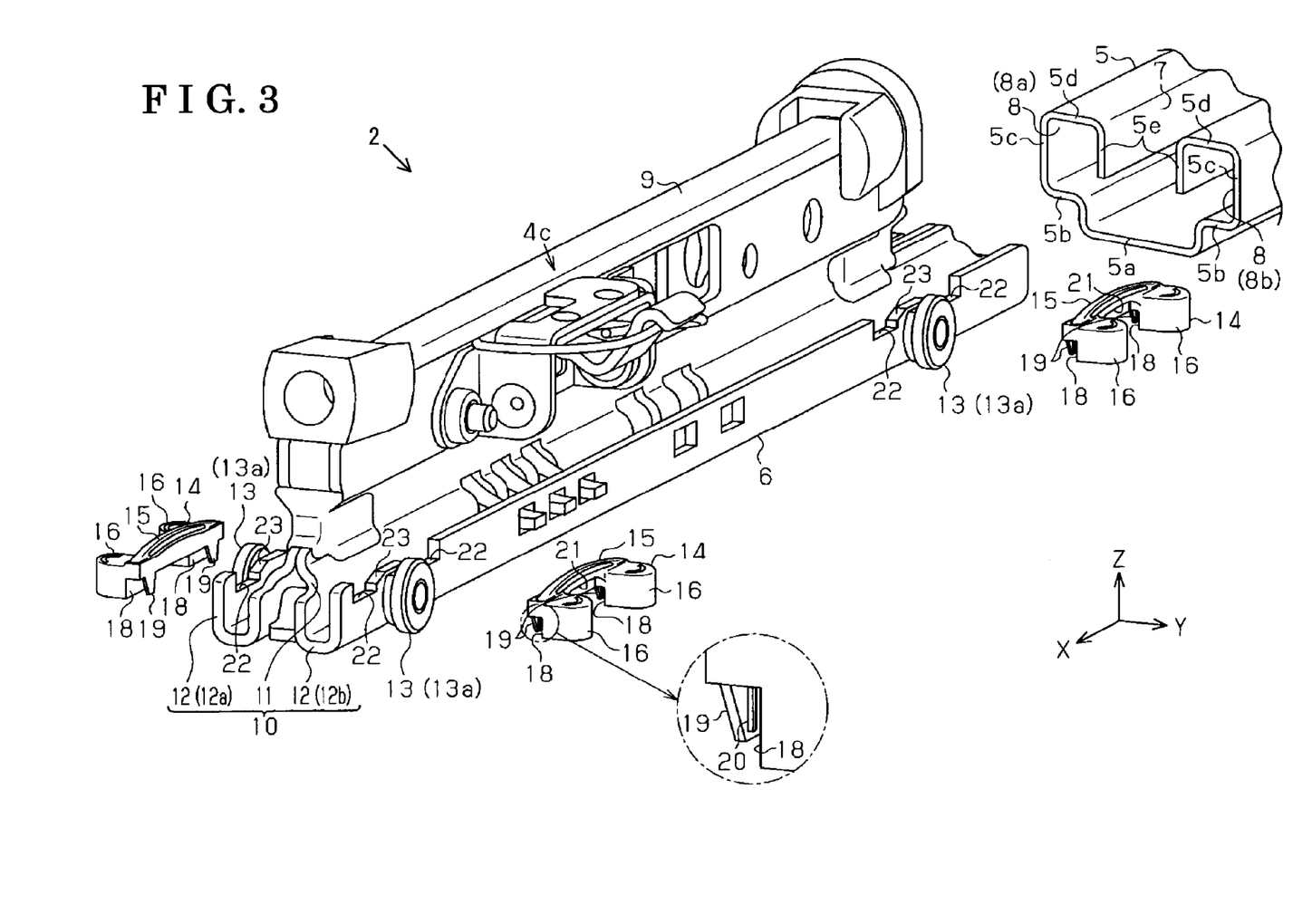
FIG. 3 is an exploded perspective view of a rail unit arranged at the seat slide apparatus according to the embodiment.

As illustrated in FIG. 3, a lower rail 5 adapted to be attached to the floor 3 and an upper rail 6 adapted to be attached to a lower surface of the seat 1 are arranged at each of the rail units 4a and 4b. The upper rail 6 is slidable relative to the lower rail 5 along a longitudinal direction thereof (the longitudinal direction is a direction along an X-axis in FIG. 3). The lower rail 5 is configured to support the upper rail 6, therefore being configured to be longer than the upper rail 6. Each of the rail units 4a and 4b is configured so that the upper rails 6 for the second-row seat and the third-row seat, respectively, are arranged on the single lower rail 5. The lower rail 5 corresponds to a support rail and the upper rail 6 corresponds to a movable rail.

Figure 4:
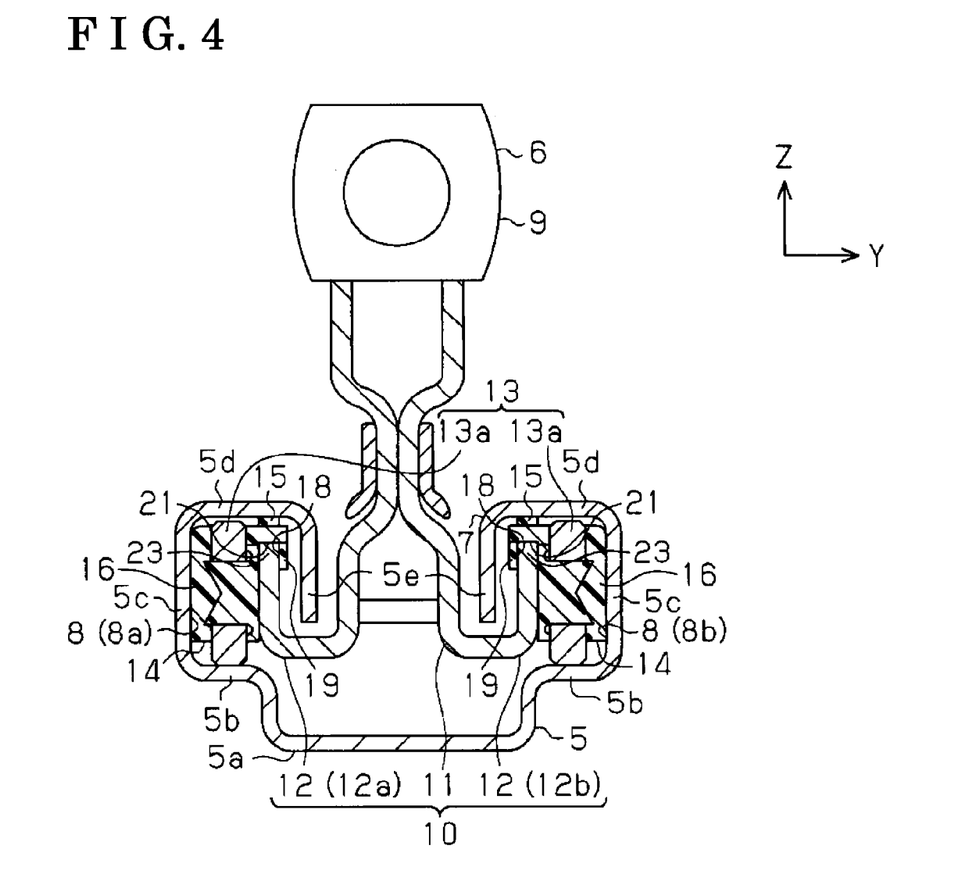
FIG. 4 is a partial cross-sectional view illustrating a roller and a shoe of the rail unit.

As illustrated in FIGS. 3 and 4, a continuous groove 7 is formed in an upper surface of the lower rail 5 so as to be recessed entirely along the longitudinal direction of the lower rail 5 (along the direction along the X-axis in FIG. 3). In addition, as illustrated in FIG. 4, void portions 8 are formed within the lower rail 5 so as to connect to the continuous groove 7. A pair of void portions 8 is arranged at both sides of the lower rail 5 in a width direction thereof (the width direction is a direction along a Y-axis in FIG. 4) in such a way that the continuous groove 7 is substantially centered between the void portions 8. According to the embodiment, the void portions 8 are formed by a void portion 8a at an exterior side of the lower rail 5 in the width direction (on the left side in FIG. 4) and a void portion 8b at an interior side of the lower rail 5 in the width direction (on the right side in FIG. 4). The void portions 8a and 8b will be hereinafter referred to as an exterior-side void portion 8a and an interior-side void portion 8b. A sheet of steel material (a steel plate) is processed to be bent, thereby forming the lower rail 5.

A main body 9 being cylindrically hollow and supporting the seat 1 in a contact manner, and a downwardly extending portion 10 branched into two portions are arranged at the upper rail 6. The downwardly extending portion 10 includes a two-branched portion 11 and a pair of bent portions 12. The two-branched portion 11 located at a base of the downwardly extending portion 10 is formed by two plate members overlapped with each other. The bent portions 12 are bent upwardly from ends of the plate members of the two-branched portion 11. The bent portions 12 each formed in an L-shape in cross section are symmetrically arranged in a width direction of the upper rail 6 (the width direction is the direction along the Y-axis in FIG. 4). According to the embodiment, the pair of bent portions 12 is formed by a bent portion 12a at an exterior side of the upper rail 6 in the width direction (on the left side in FIG. 4) and a bent portion 12b at an interior side of the upper rail 6 in the width direction (on the right side in FIG. 4). The bent portions 12a and 12b will be hereinafter referred to as an exterior-side bent portion 12a and an interior-side bent portion 12b. In addition, each of the bent portions 12 corresponds to an attachment portion to which a vibration restricting member is attached.

The upper rail 6 is configured so that the two-branched portion 11 is inserted in the continuous groove 7 of the lower rail 5 and so that the bent portions 12a and 12b are arranged to be accommodated in the void portions 8a and 8b, respectively. The upper rail 6 slides relative to the lower rail 5 along the continuous groove 7 in the longitudinal direction of the vehicle body. In addition, a slide position of the upper rail 6, i.e, a position of the seat 1 in the longitudinal direction of the vehicle body is retained by a seat lock mechanism 4c (in FIG. 3) arranged between the lower rail 5 and the upper rail 6.

As illustrated in FIGS. 2 to 6, multiple roller pairs 13 allowing (guiding) the upper rail 6 to slide relative to the lower rail 5 are arranged at multiple positions of the upper rail 6 in the longitudinal direction (in a direction along an X-axis in FIG. 2). The multiple roller pairs 13 are pivotally supported by respective front and rear ends of the upper rail 6. Each of the multiple roller pairs 13 includes rollers 13a (wheels) arranged at both sides of the upper rail 6 in the width direction. The roller pair 13 is configured so that one of the rollers 13a is pivotally supported by a side wall surface of the exterior-side bent portion 12a and so that the other one of the rollers 13a is pivotally supported by a side wall surface of the interior-side bent portion 12b. According to the embodiment, the four rollers 13a are arranged at each of the upper rails 6 arranged in the width direction of the seat 1, that is, the eight rollers 13a are arranged at the whole seat 1.

As illustrated in FIG. 4, the rollers 13a arranged in the void portions 8 are positioned on respective upper surfaces of roller rolling walls 5b of the lower rail 5. Each of the roller rolling walls 5b is provided in a position raised from a bottom wall 5a of the lower rail 5 in a vertical direction corresponding to a direction along a Z-axis in FIG. 4 (the lower rail 5 further includes exterior walls 5c, upper walls 5d, and interior walls 5e. When the upper rail 6 slides relative to the lower rail 5 in the longitudinal direction, the rollers 13a roll on the upper surfaces of the roller rolling walls 5b, thereby allowing the upper rail 6 to smoothly slide relative to the lower rail 5, i.e., the position of the seat 1 may be adjusted in the longitudinal direction by means of a small force. In addition, each of the void portions 8 is defined by an area surrounded by the bottom wall 5a, the roller rolling wall 5b, the exterior wall 5c, the upper wall 5d, and the interior wall 5e. In addition, the continuous groove 7 is an area surrounded by the interior walls 5e arranged in the width direction.

As illustrated in FIGS. 2 to 6, multiple shoes 14 are attached to multiple portions of the upper rail 6. Each of the shoes 14 restricts vibrations between the lower rail 5 and the upper rail 6. The shoe 14 is formed by a resin piece for restricting the vibrations. According to the embodiment, the single rail unit 4 is provided with the four shoes 14 arranged at respective front and rear ends of the exterior-side bent portion 12a in the longitudinal direction and at respective front and rear ends of the interior-side bent portion 12b in the longitudinal direction. Thus, the four shoes 14 are arranged in each of the upper rails 6 arranged in the width direction of the seat 1, that is, the eight shoes 14 are arranged at the whole seat 1. In addition, the shoe 14 corresponds to the vibration restricting member.

As illustrated in FIGS. 3 to 6, the shoe 14 includes an upper-side sliding contact section 15 and a pair of exterior-side sliding contact sections 16. The upper-side sliding contact section 15 restricts vibrations in a vertical direction of the upper rail 6 (in a direction along a Z-axis in FIG. 3). The pair of exterior-side sliding contact sections 16 restricts vibrations in the width direction of the upper rail 6 (in a direction along a Y-axis in FIG. 3). A cavity is formed in an area of an upper portion of the shoe 14, thereby forming the upper-side sliding contact section 15. The upper-side sliding contact section 15 is slidable on an inner surface of the upper wall 5d of the lower rail 5. A cavity is formed in an area of an exterior side portion of the shoe 14 as seen in the width direction of the upper rail 6, thereby forming the pair of exterior-side sliding contact sections 16. The exterior-side sliding contact sections 16 are slidable on an inner surface of the exterior wall 5c of the lower rail 5. In addition, the upper-side sliding contact section 15 corresponds to an upper sliding contact portion and the exterior-side sliding contact section 16 corresponds to an exterior sliding contact portion.

Figure 7:
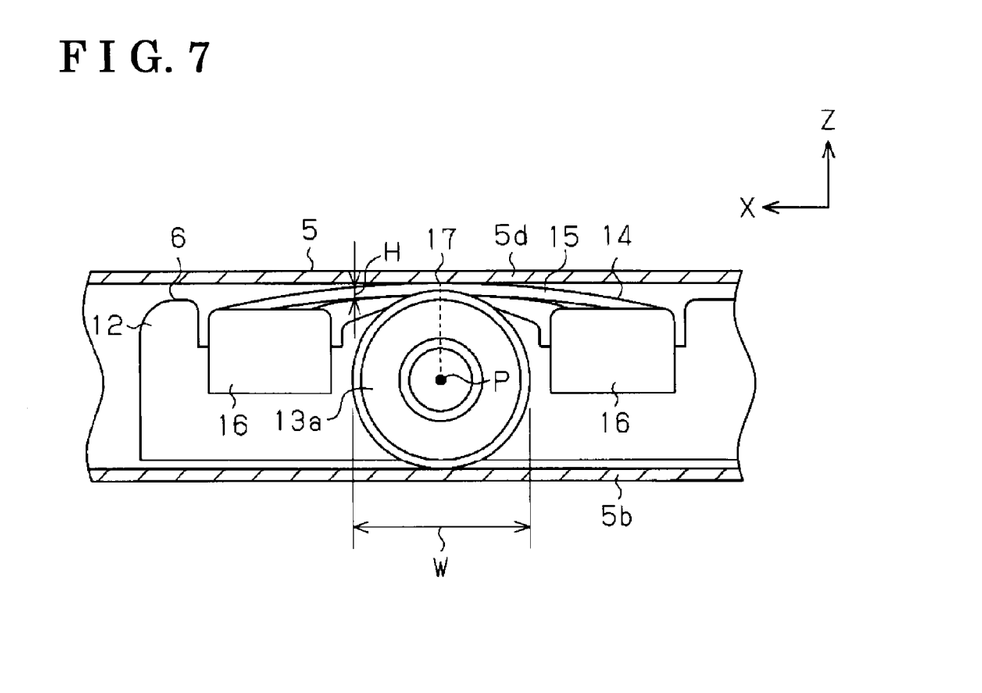
FIG. 7 is a schematic view illustrating a state where the shoe is attached to the upper rail.

As illustrated in FIG. 7, according to the embodiment, a sliding contact point 17 is positioned at the upper-side sliding contact section 15 so as to overlap an area W of a diameter of the roller 13a in the longitudinal direction of the upper rail 6 and the lower rail 5 (in a direction along an X-axis in FIG. 7, i.e. in the sliding direction of the upper rail 6). A sliding load in the vertical direction of the upper rail 6 and the lower rail 5 (in a direction along a Z-axis in FIG. 7) is received by the sliding contact point 17. The position of the sliding contact point 17 is set as described above in order to allow the upper rail 6 to slide relative to the lower rail 5 by a small load under a state the vibrations between the lower rail 5 and the upper rail 6 are minimized, for example, even in a case where the lower rail 5 is configured to form a round shape protruding downwardly or upwardly. The sliding contact point 17 corresponds to a contact surface of the upper-side sliding contact section 15 relative to the upper wall 5d of the lower rail 5. According to the embodiment, the shoe 14 is provided in a position in which the sliding contact point 17 and an axial center P of the roller 13a are substantially at the same position in the longitudinal direction of the upper rail 6 and the lower rail 5 (in the sliding direction of the upper rail 6).

As illustrated in FIGS. 3 and 4, the shoe 14 includes a pair of fixing voids 18 formed at an interior side portion of the shoe 14 in the width direction of the upper rail 6, and a pair of locking portions 19 protruding downwardly from the interior side portion. The fixing voids 18 correspond to attachment portions attached to the bent portions 12a and 12b, respectively. Each of the fixing voids 18 is formed by the exterior-side sliding contact section 16 and the locking portion 19. The locking portions 19 are protrusions by which the shoes 14 are fixed to the bent portions 12a and 12b, respectively, in the width direction of the upper rail 6 (in the direction along the Y-axis in FIG. 3). Ribs 20 are formed at inner surfaces of the locking portions 19, respectively. The shoe 14 further includes a stepped portion 21 positioned between the pair of exterior-side sliding contact sections 16. The stepped portion 21 is formed at a position raised from the fixing voids 18 in the vertical direction in FIG. 4. In addition, the fixing voids 18 and the locking portions 19 configure a fixing mechanism and the stepped portion 21 configures a positioning mechanism.

Pairs of cut portions 22 are formed in the bent portion 12a in the longitudinal direction of the upper rail 6 while pairs of cut portions 22 are formed in the bent portion 12b in the longitudinal direction of the upper rail 6. Each pair of cut portions 22 is positioned so that the roller 13a is arranged between the pair of cut portions 22 in the longitudinal direction. A protruding portion 23 is arranged between the pair of cut portions 22 in the longitudinal direction so as to be raised from cut surfaces of the cut portions 22 in the vertical direction in FIG. 3 (in the direction along the Z-axis in FIG. 3). In a case where the shoe 14 is inserted in the cut portions 22, a position of the shoe 14 in the vertical direction of the upper rail 6 (in the direction along the Z-axis in FIG. 3) is determined by both the protruding portion 23 and the stepped portion 21 of the shoe 14. In addition, when the shoes 14 are attached to the bent portion 12a and the bent portion 12b, the shoes 14 are press-fitted to the bent portion 12a and the bent portion 12b, respectively, by the ribs 20 of the locking portions 19 of each of the shoes 14. In addition, the protruding portion 23 configures the positioning mechanism.

Figure 5:
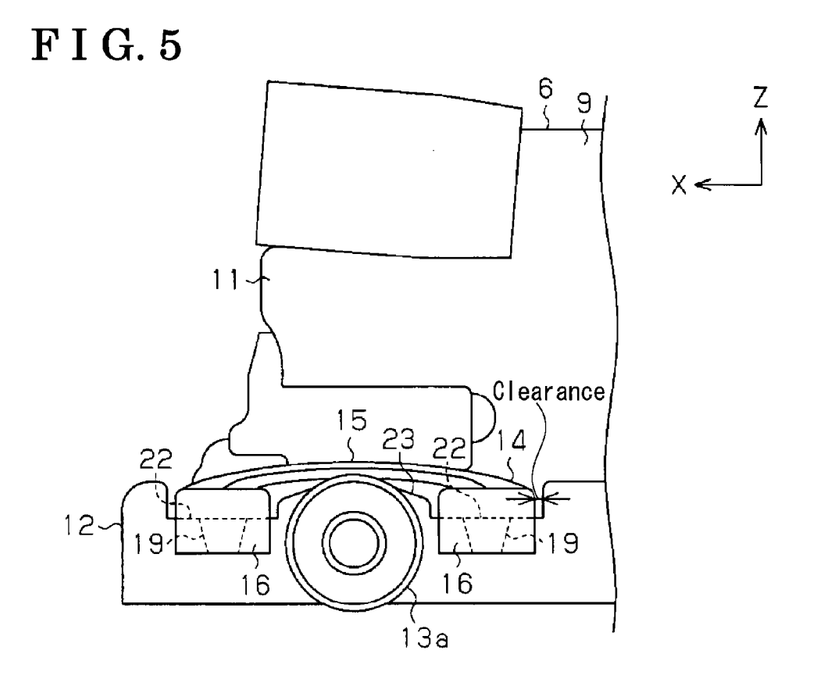
FIG. 5 is a side view of an attachment portion of an upper rail where the roller is attached.
Figure 6:
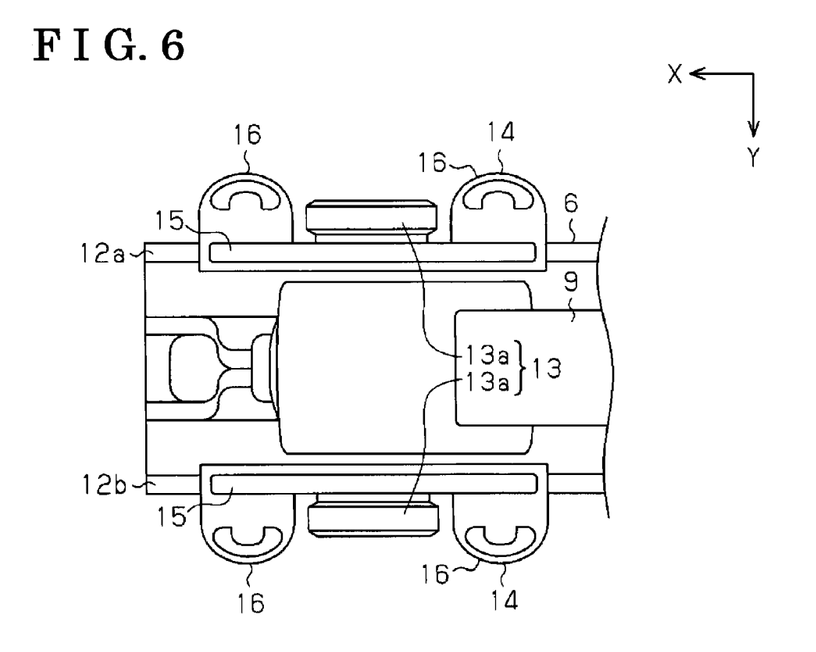
FIG. 6 is a top plan view of the attachment portion of the upper rail where the roller is attached.

As illustrated in FIG. 5, substantially small clearances are formed between the shoe 14 and the cut portions 22 in the longitudinal direction of the upper rail 6 (in a direction along an X-axis in FIG. 5). Accordingly, when the shoe 14 is attached to the bent portion 12, the stepped portion 21 of the shoe 14 is in contact with the protruding portion 23 of the upper rail 6, thereby preventing the shoe 14 from moving in the vertical direction of the upper rail 6 while being slightly movable in the longitudinal direction of the upper rail 6. In addition, when the shoe 14 is attached to the bent portion 12, the roller 13a is positioned between the pair of exterior-side sliding contact sections 16 in the longitudinal direction of the upper rail 6.

Next, effects of the seat slide apparatus 2 according to the embodiment will be explained as follows with reference to FIGS. 7 to 10. As illustrated in FIG. 7, according to the embodiment, the shoe 14 is configured so that the sliding contact point 17 (to which the sliding load in the vertical direction corresponding to the direction along the Z-axis in FIG. 7 is applied) is positioned to overlap the area W of the diameter of the roller 13a in the longitudinal direction of the upper rail 6 (in the direction along the X-axis in FIG. 7). Therefore, for example, even in the case where the lower rail 5 is formed to be curved downwardly or upwardly, a clearance H between the sliding contact point 17 and the roller 13a in the vertical direction of the upper rail 6 is substantially uniform at respective slide positions of the upper rail 6 relative to the lower rail 5 in the longitudinal direction.

Figure 8:
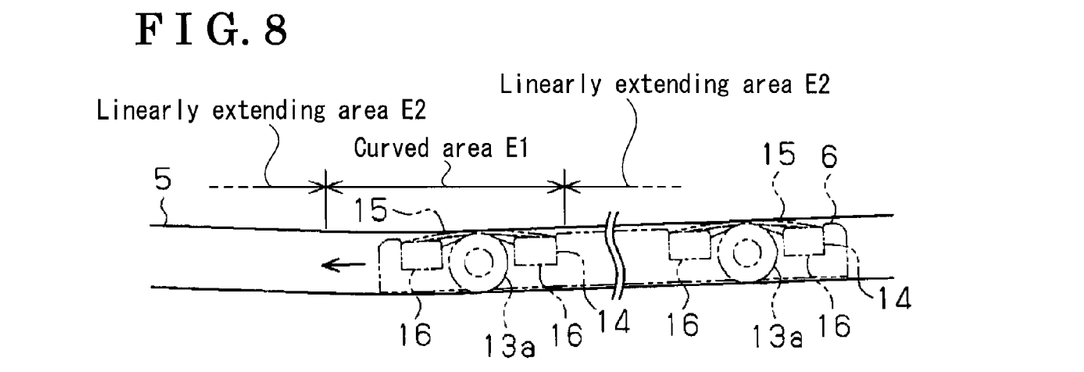
FIG. 8 is an explanation drawing illustrating a state where the upper rail slides relative to a lower rail that is curved downwardly.
Figure 9:
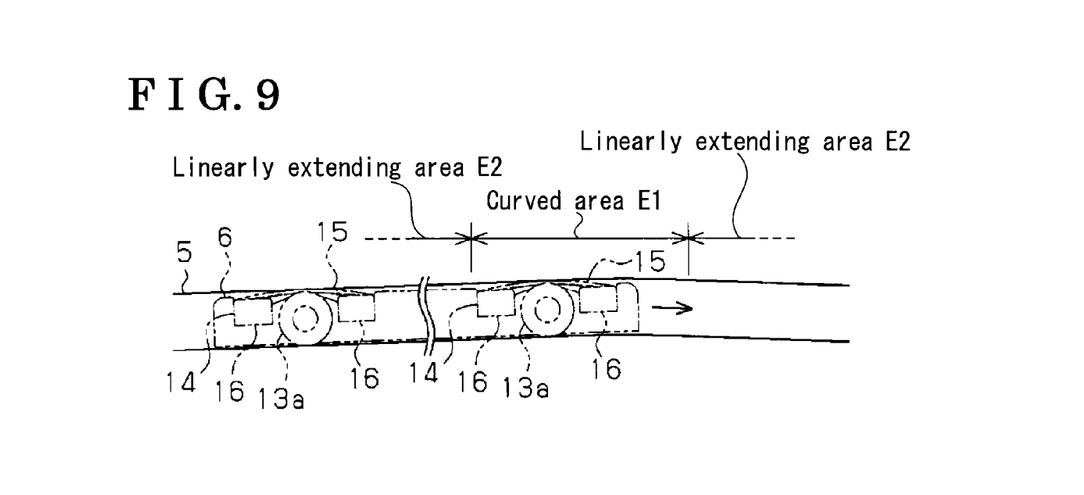
FIG. 9 is an explanation drawing illustrating a state where the upper rail slides relative to the lower rail that is curved upwardly.

Thus, for example, even in a case where the lower rail 5 is curved to form a round shape protruding downwardly as illustrated in FIG. 8 or even in a case where the lower rail 5 is curved to form a round shape protruding upwardly as illustrated in FIG. 9, the roller 13a moves through a curved area E1 along the longitudinal direction of the lower rail 5 substantially in a similar sliding manner to when the roller 13a moves through linearly extending areas E2 along the longitudinal direction. Therefore, regardless of the shape of the lower rail 5, when the rollers 13a move through the curved area E1, the seat 1 may slide along the longitudinal direction substantially in a similar manner to when the rollers 13a move through the linearly extending areas E2.

Figure 10:
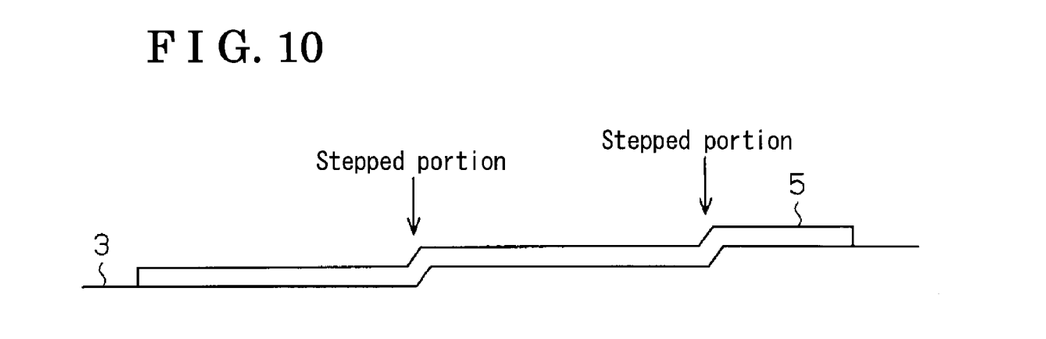
FIG. 10 is a schematic view illustrating a case where the lower rail including stepped portions in a mid-section is arranged on a floor of a vehicle.

FIG. 10 illustrates a case where the lower rail 5 is arranged on the floor 3 along a longitudinal direction in the vehicle, for example, the van or the minivan. The lower rail 5 arranged on the floor 3 of the van or minivan may be configured to have stepped portions in a mid-section, which stepped portions have an upwardly or downwardly curved shape because of the shape of the floor 3 of the van or the minivan. Even in such case, the aforementioned configuration of the seat slide apparatus 2 according to the embodiment is utilized; thereby, the upper rail 6 may smoothly slide relative to the lower rail 5 having the stepped portions having the upwardly or downwardly curved shape. Therefore, for example, an occupant of the van or the minivan may move the front seat rearward to an area where the second-row seat is arranged; thereby, the occupant may sit in the front seat in a comfortable orientation. Likewise, for example, the occupant may move the second-row seat forward to an area where the front seat is arranged; thereby, a large luggage space located at a rear side of the second-row seat may be further increased.

According to the aforementioned configuration of the seat slide apparatus 2 of the embodiment, following effects may be obtained. According to the embodiment, the shoe 14 is positioned to overlap the roller 13a in the longitudinal direction (the sliding direction) of the upper rail 6. Therefore, for example, even in the case that the lower rail 5 is configured to be curved upwardly or downwardly, a load may be applied approximately equally from the lower rail 5 to the shoe 14 both when the upper rail 6 moves through the curved area E1 and when the upper rail 6 moves through the linearly extending areas E2. Consequently, when the upper rail 6 moves through the curved area E1, the upper rail 6 may slide relative to the lower rail 5 substantially in a similar manner to when the upper rail 6 moves through the linearly extending areas E2. As a result, in the condition that the lower rail 5 is curved upwardly or downwardly, the substantially same sliding movement of the upper rail 6 relative to the lower rail 5 may be obtained when the upper rail 6 moves through any area of the lower rail 5 along the longitudinal direction.

Further, according to the seat slide apparatus 2 of the embodiment, the shoe 14 is arranged in a position in which the sliding contact point 17 and the axial center P of the roller 13a substantially overlap each other in the longitudinal direction of the upper rail 6 and the lower rail 5 (in the sliding direction of the upper rail 6). As a result, the clearance H between the sliding contact point 17 and the roller 13a in the vertical direction of the upper rail 6 may not significantly change; therefore, the smooth sliding movement of the upper rail 6 relative to the lower rail 5 may be further attained.

Furthermore, according to the seat slide apparatus 2 of the embodiment, the pair of locking portions 19 is arranged at the interior side portion of the shoe 14. When attaching the shoe 14 to the bent portion 12, the pair of locking portions 19 is engaged with the bent portion 12 (the cut portions 22); thereby, the shoe 14 is fixed to the upper rail 6 in the width direction thereof. As a result, the shoe 14 may not be easily dislocated in the width direction of the upper rail 6 (in the width direction of the seat 1), therefore being appropriately retained in the width direction of the upper rail 6.

Further, according to the seat slide apparatus 2 of the embodiment, when attaching the shoe 14 to the bent portion 12, the stepped portion 21 of the shoe 14 is brought into contact with the protruding portion 23 of the bent portion 12; thereby, the position of the shoe 14 in the vertical direction of the upper rail 6 is determined. Thus, the shoe 14 may be appropriately positioned in the vertical direction of the upper rail 6.

Furthermore, according to the seat slide apparatus 2 of the embodiment, the pair of exterior-side sliding contact sections 16 for restricting vibrations in the width direction of the upper rail 6 is formed at the shoe 14 so as to be positioned side by side in the longitudinal direction of the upper rail 6. Therefore, the vibrations in the width direction of the upper rail 6 may be received by the pair of exterior-side sliding contact sections 16, thereby being further effectively absorbed. Additionally, for example, even in a case where the upper rail 6 slides slightly obliquely relative to the lower rail 5, one of the pair of exterior-side sliding contact sections 16 may receive a load, thereby effectively restricting the vibrations in the width direction.

In addition, according to the seat slide apparatus 2 of the embodiment, the shoes 14 are arranged at the rollers 13a, respectively. Therefore, the vibrations between the lower rail 5 and the upper rail 6 may be further absorbed. In addition, the seat slide apparatus 2 according to the embodiment may be modified as follows.

Figure 11:
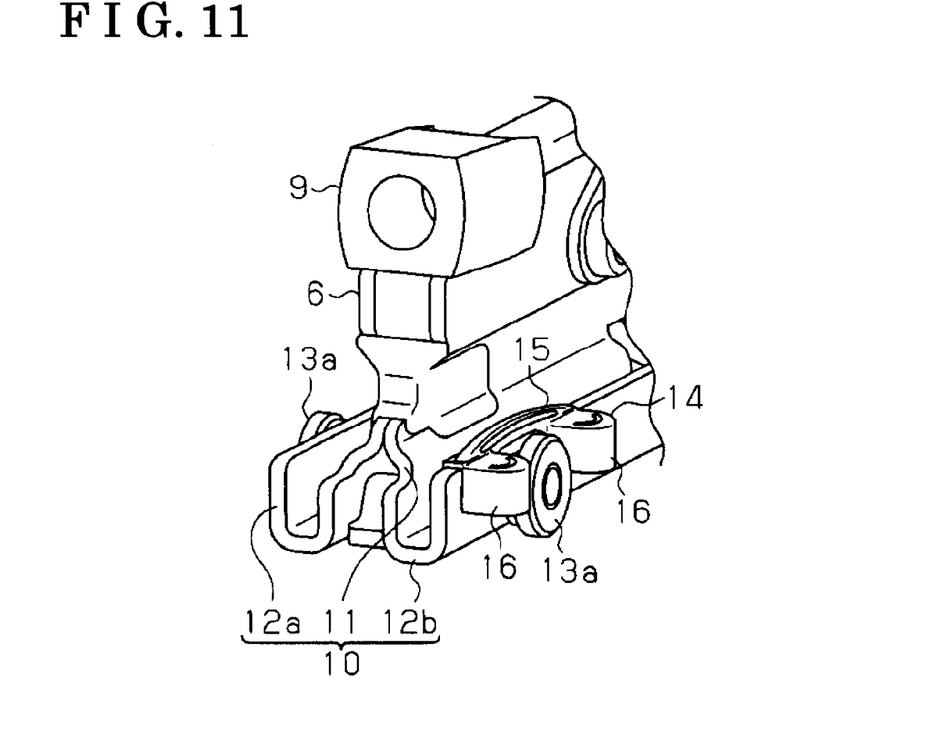
FIG. 11 is a partial schematic perspective view of the upper rail of the seat slide apparatus according to a first modified example of the embodiment disclosed here.

According to the seat slide apparatus 2 of the embodiment, the shoes 14 are attached to the pair of rollers 13a arranged in the width direction of the upper rail 6. Alternatively, according to the seat slide apparatus 2 of a first modified example of the embodiment, the shoe 14 may be attached to only one of the pair of rollers 13a arranged in the width direction of the upper rail 6 (see FIG. 11).

Figure 12:
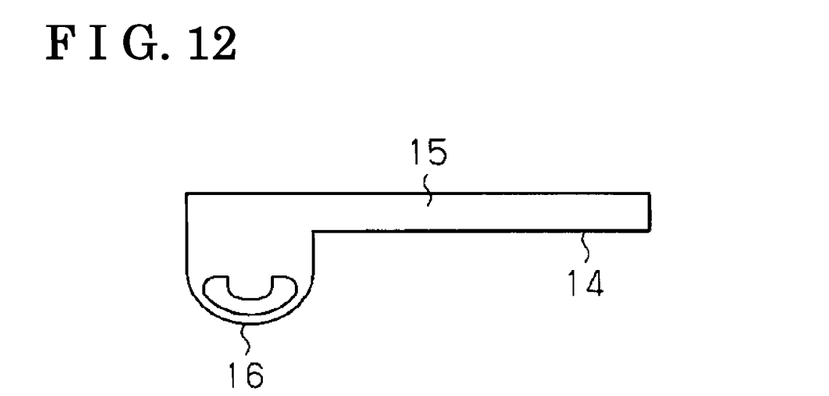
FIG. 12 is a top plan view of the shoe of the seat slide apparatus according to a second modified example of the embodiment disclosed here.

According to the seat slide apparatus 2 of the embodiment, the shoe 14 is configured to include the pair of exterior-side sliding contact sections 16 in the longitudinal direction. Alternatively, according to the seat slide apparatus 2 of a second modified example of the embodiment, the single exterior-side sliding contact section 16 may be arranged at the shoe 14 in the longitudinal direction as illustrated in FIG. 12. In addition, according to the embodiment, the shoe 14 includes the upper-side sliding contact section 15 and the pair of exterior-side sliding contact sections 16. Alternatively, the shoe 14 may include at least the upper-side sliding contact section 15. In other words, the shape or the configuration of the shoe 14 may be modified as long as the shoe 14 is configured at least so as to restrict the vibrations between the lower rail 5 and the upper rail 6 in the vertical direction.

Further, the sliding contact point 17 of the shoe 14 may be arranged in any position as long as the sliding contact point 17 is positioned to overlap the roller 13a in the sliding direction of the upper rail 6. Furthermore, according to the embodiment, the shoes 14 are arranged at all of the rollers 13a. Alternatively, the shoes 14 may be arranged partially at all of the rollers 13a.

Moreover, according to the seat slide apparatus 2 of the embodiment, the pair of rollers 13a is arranged at the upper rail 6 in the width direction thereof. Alternatively, the single roller 13a may be arranged at the upper rail 6 in the width direction thereof. In addition, according to the embodiment, the pairs of rollers 13a and the pairs of shoes 14 in the width direction of the upper rail 6 are arranged at the front and rear ends of the upper rail 6. Alternatively, for example, the pairs of rollers 13a and the pairs of shoes 14 in the width direction of the upper rail 6 may be arranged at the front and rear ends of the upper rail 6 and at an intermediate portion of the upper rail 6 in the longitudinal direction thereof.

According to the seat slide apparatus 2 of the embodiment, the plural upper rails 6 are slidably attached to the single lower rail 5. Alternatively, for example, the lower rail 5 and the upper rail 6 may be provided in a pair. In such case, the lower rail 5 may be attached to the seat 1 and the upper rail 6 may be attached to the floor 3.

Moreover, the shoe 14 having the shape described in the embodiment serves as the vibration restricting member. Alternatively, the shoe 14 may be modified to have a different shape or a different configuration from that of the embodiment as long as the shoe 14 may restrict the vibrations between the lower rail 5 and the upper rail 6. In addition, according to the embodiment, the floor 3 serves as the seat attachment surface. Alternatively, a different area from the floor 3 may serve as the seat attachment surface.

Further, according to the seat slide apparatus 2 of the embodiment, the configuration in which the locking portions 19 are utilized is applied as the fixing mechanism. Alternatively, the fixing mechanism may be modified to have a different shape or a different configuration from the configuration in which the locking portions 19 are utilized. Furthermore, according to the embodiment, the positioning mechanism is formed by the configuration including the stepped portion 21 and the protruding portion 23. Alternatively, the positioning mechanism may be modified to have a different shape or a configuration from the configuration including the stepped portion 21 and the protruding portion 23 in the embodiment.

According to the embodiment, the seat slide apparatus 2 is adapted to the vehicle. Alternatively, the seat slide apparatus 2 may be applied to a different apparatus or a different unit from the vehicle.

As described above, according to the aforementioned embodiment, the seat slide apparatus 2 includes the lower rail 5 adapted to be attached to one of the seat 1 and the floor 3, the upper rail 6 configured to be slidable relative to the lower rail 5, the roller 13a arranged between the lower rail 5 and the upper rail 6 and guiding the upper rail 6 to move relative to the lower rail 5, and the shoe 14 arranged between the lower rail 5 and the upper rail 6 to restrict the vibrations between the lower rail 5 and the upper rail 6, the shoe 14 including the sliding contact point 17 receiving the sliding load in the vertical direction of the upper rail 6, the sliding contact point 17 being arranged to overlap the roller 13a in the sliding direction of the upper rail 6.

According to the embodiment, the shoe 14 is positioned to overlap the roller 13a in the longitudinal direction (the sliding direction) of the upper rail 6 as described above. Therefore, for example, even in the case that the lower rail 5 is configured to be curved upwardly or downwardly, a load may be applied approximately equally from the lower rail 5 to the shoe 14 both when the upper rail 6 moves through the curved area E1 and when the upper rail 6 moves through the linearly extending areas E2. Consequently, when the upper rail 6 moves through the curved area E1, the upper rail 6 may slide relative to the lower rail 5 substantially in a similar manner to when the upper rail 6 moves through the linearly extending areas E2. As a result, in the condition that the lower rail 5 is curved upwardly or downwardly, the substantially same sliding movement of the upper rail 6 relative to the lower rail 5 may be obtained when the upper rail 6 moves through any area of the lower rail 5 along the longitudinal direction.

According to the aforementioned embodiment, the shoe 14 is provided in the position in which the sliding contact point 17 is arranged to overlap the axial center P of the roller 13a in the sliding direction of the upper rail 6.

According to the aforementioned configuration, the clearance H between the sliding contact point 17 and the roller 13a in the vertical direction of the upper rail 6 may not significantly change when the upper rail 6 moves through the curved area E1 and when the upper rail 6 moves through the linearly extending areas E2. Therefore, the smooth sliding movement of the upper rail 6 relative to the lower rail 5 may be further attained.

According to the aforementioned embodiment, the seat slide apparatus 2 further includes the fixing voids 18 and the locking portions 19 which are provided between the shoe 14 and the bent portion 12 to which the shoe 14 is attached. The fixing voids 18 and the locking portions 19 fix the shoe 14 to the bent portion 12 in the width direction of the upper rail 6.

According to the aforementioned configuration, the shoe 14 may not be easily dislocated in the width direction of the upper rail 6 (in the width direction of the seat 1), therefore being appropriately retained in the width direction of the upper rail 6.

According to the aforementioned embodiment, the seat slide apparatus 2 further includes the stepped portion 21 and the protruding portion 23 which are provided between the shoe 14 and the bent portion 12 to which the shoe 14 is attached. The stepped portion 21 and the protruding portion 23 determine the position of the shoe 14 in the vertical direction of the upper rail 6 when the shoe 14 is attached to the bent portion 12.

According to the aforementioned configuration, when attaching the shoe 14 to the bent portion 12, the stepped portion 21 of the shoe 14 is brought into contact with the protruding portion 23 of the bent portion 12; thereby, the position of the shoe 14 in the vertical direction of the upper rail 6 is determined. Thus, the shoe 14 may be appropriately positioned in the vertical direction of the upper rail 6.

According to the aforementioned embodiment, the shoe 14 includes the upper-side sliding contact section 15 receiving the sliding load in the vertical direction of the upper rail 6 and the exterior-side sliding contact section 16 receiving the sliding load in the width direction of the upper rail 6.

According to the aforementioned embodiment, the exterior-side sliding contact section 16 includes the pair of exterior-side sliding contact sections 16, and the pair of exterior-side sliding contact sections 16 is provided in the sliding direction of the upper rail 6 so that the roller 13a is positioned between the pair of exterior-side sliding contact sections 16.

According to the aforementioned configuration, the pair of exterior-side sliding contact sections 16 for restricting the vibrations in the width direction of the upper rail 6 is formed at the shoe 14 so as to be positioned side by side in the longitudinal direction of the upper rail 6. Therefore, the vibrations in the width direction of the upper rail 6 may be further effectively absorbed.

According to the aforementioned embodiment, the roller 13a configures the roller pair 13 including the wheels in the width direction of the upper rail 6. The roller pair 13 includes the plural roller pairs 13. The plural roller pairs 13 are provided at the plural positions in the sliding direction of the upper rail 6. The shoe 14 includes the plural shoes 14, and the plural shoes 14 are arranged at the rollers 13a, respectively, provided at the plural positions in the sliding direction of the upper rail 6.

As described above, the shoes 14 are arranged at the rollers 13a, respectively; therefore, the vibrations between the lower rail 5 and the upper rail 6 may be further absorbed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus, comprising:
a support rail adapted to be attached to one of a seat and a seat attachment surface;
a movable rail configured to be slidable relative to the support rail;
a roller arranged between the support rail and the movable rail and guiding the movable rail to move relative to the support rail; and
a vibration restricting member arranged between the support rail and the movable rail to restrict a vibration between the support rail and the movable rail, the vibration restricting member including a sliding contact point receiving a sliding load in a vertical direction of the movable rail, the sliding contact point being arranged adjacent to the roller in a width direction of the movable rail;
wherein the vibration restricting member includes a fixing mechanism that is an attachment portion that fixes to an attachment portion of the movable rail in a width direction of the movable rail.

2. The seat slide apparatus according to claim 1, wherein the vibration restricting member is provided in a position in which the sliding contact point is arranged adjacent to an axial center of the roller in a sliding direction of the movable rail.

3. The seat slide apparatus according to claim 1, wherein the roller configures a roller pair including wheels in a width direction of the movable rail, the roller pair including a plurality of roller pairs, and the plurality of roller pairs is provided at a plurality of positions in a sliding direction of the movable rail, and
wherein the vibration restricting member includes a plurality of vibration restricting members, and the plurality of vibration restricting members is arranged at each of the rollers, respectively, provided at the plurality of positions in the sliding direction of the movable rail.

4. A seat slide apparatus, comprising:
a support rail adapted to be attached to one of a seat and a seat attachment surface;
a movable rail configured to be slidable relative to the support rail;
a roller arranged between the support rail and the movable rail and guiding the movable rail to move relative to the support rail; and
a vibration restricting member arranged between the support rail and the movable rail to restrict a vibration between the support rail and the movable rail, the vibration restricting member including a sliding contact point receiving a sliding load in a vertical direction of the movable rail, the sliding contact point being arranged adjacent to the roller in a width direction of the movable rail;
wherein the vibration restricting member includes a positioning mechanism and an attachment portion, the positioning mechanism determining a position of the vibration restricting member in the vertical direction of the movable rail when the vibration restricting member is attached to an attachment portion of the movable rail.

5. A seat slide apparatus, comprising:
a support rail adapted to be attached to one of a seat and a seat attachment surface;
a movable rail configured to be slidable relative to the support rail; and
a roller arranged between the support rail and the movable rail and guiding the movable rail to move relative to the support rail; and
a vibration restricting member arranged between the support rail and the movable rail to restrict a vibration between the support rail and the movable rail, the vibration restricting member including a sliding contact point receiving a sliding load in a vertical direction of the movable rail, the sliding contact point being arranged adjacent to the roller in a width direction of the movable rail;
wherein the vibration restricting member includes an upper sliding contact portion receiving the sliding load in the vertical direction of the movable rail and an exterior sliding contact portion receiving a sliding load in the width direction of the movable rail.

6. The seat slide apparatus according to claim 5, wherein the exterior sliding contact portion includes a pair of exterior sliding contact portions, and the pair of exterior sliding contact portions is provided in a sliding direction of the movable rail so that the roller is positioned between the pair of exterior sliding contact portions.

* * * * *